United States Patent
Glynn et al.

(10) Patent No.: US 12,368,756 B2
(45) Date of Patent: Jul. 22, 2025

(54) SECONDARY DATA ENCRYPTION VIA BROWSER EXTENSION

(71) Applicant: Capital One Services, LLC, McLean, VA (US)

(72) Inventors: Anthony Glynn, Washington, DC (US); Soumendra Bhattacharya, Union City, CA (US); Collin Berman, Snoqualmie, WA (US)

(73) Assignee: Capital One Services, LLC, McLean, VA (US)

( * ) Notice: Subject to any disclaimer, the term of this patent is extended or adjusted under 35 U.S.C. 154(b) by 197 days.

(21) Appl. No.: 18/223,786

(22) Filed: Jul. 19, 2023

(65) Prior Publication Data

US 2025/0030734 A1   Jan. 23, 2025

(51) Int. Cl.
*H04L 9/40* (2022.01)

(52) U.S. Cl.
CPC ........ *H04L 63/166* (2013.01); *H04L 63/0823* (2013.01)

(58) Field of Classification Search
CPC ... H04L 63/166; H04L 63/0823; H04L 63/06; H04L 67/02; H04L 63/0428; H04W 12/03; H04W 12/041; H04W 12/69
See application file for complete search history.

(56) References Cited

U.S. PATENT DOCUMENTS 9,537,864 B2 * 1/2017 Templin .............. H04L 63/10
9,614,670 B1 * 4/2017 Ghetti .............. H04L 63/065
10,075,437 B1 * 9/2018 Costigan .............. H04L 63/166
10,255,445 B1 * 4/2019 Brinskelle .............. G06F 21/606
(Continued)

FOREIGN PATENT DOCUMENTS

WO  2012023050 A2  2/2012

OTHER PUBLICATIONS

Corner, Matthew, et al. "A usability evaluation of privacy add-ons for web browsers." Design, User Experience, and Usability. Practice and Case Studies: 8th International Conference, DUXU 2019, Held as Part of the 21st HCI International Conference, HCII 2019, Orlando, FL, USA, Jul. 26-31, 2019, Proceedings, Part I.*

(Continued)

*Primary Examiner* — Jimmy H Tran
(74) *Attorney, Agent, or Firm* — Banner & Witcoff, Ltd.

(57) ABSTRACT

Methods, systems, and apparatuses are described herein for protecting sensitive data even when Transport Layer Security (TLS) communication sessions are compromised. A computing device may send, via a web browser plugin of a web browser application executing on the computing device and to one or more remote servers, a request for a server secret that comprises a device fingerprint, an identification of the web browser application, and an identification of the web browser plugin. The computing device may receive the server secret and a public certificate associated with the remote server. The computing device may establish, via the web browser application, a TLS session with the one or more remote servers. The computing device may generate a session key. The computing device may receive data comprising unencrypted data and encrypted data. The computing device may decrypt the encrypted data based on the session key.

20 Claims, 5 Drawing Sheets

(56) References Cited

U.S. PATENT DOCUMENTS

| | | | |
|---|---|---|---|
| 10,922,631 B1* | 2/2021 | Shahidzadeh | H04W 4/029 |
| 10,951,606 B1* | 3/2021 | Shahidzadeh | H04L 63/107 |
| 10,965,453 B2* | 3/2021 | Lin | H04L 9/30 |
| 11,096,059 B1* | 8/2021 | Shahidzadeh | G06Q 50/10 |
| 11,140,136 B1* | 10/2021 | Li | H04L 63/0236 |
| 11,240,007 B1* | 2/2022 | Higgins | H04L 9/3268 |
| 11,824,840 B1* | 11/2023 | Meixler | H04L 9/3247 |
| 2009/0055642 A1* | 2/2009 | Myers | H04L 9/3263 713/155 |
| 2009/0259838 A1* | 10/2009 | Lin | H04L 9/3215 713/150 |
| 2011/0202755 A1* | 8/2011 | Orsini | H04L 9/0816 713/151 |
| 2012/0204032 A1* | 8/2012 | Wilkins | H04L 9/321 713/170 |
| 2012/0216133 A1* | 8/2012 | Barker | G06F 21/629 715/760 |
| 2014/0006780 A1* | 1/2014 | Harty | H04L 63/0428 713/168 |
| 2014/0258529 A1* | 9/2014 | Etchegoyen | G06Q 30/0277 709/225 |
| 2015/0237049 A1* | 8/2015 | Grajek | H04L 67/02 726/7 |
| 2016/0344561 A1* | 11/2016 | Grajek | H04L 63/0884 |
| 2018/0026950 A1* | 1/2018 | Wasiq | H04L 9/0841 713/152 |
| 2018/0337907 A1* | 11/2018 | Bhansali | H04L 9/3231 |
| 2018/0365399 A1* | 12/2018 | Deutschmann | H04L 63/083 |
| 2019/0190960 A1* | 6/2019 | Amro | H04L 43/08 |
| 2020/0053072 A1* | 2/2020 | Glozman | H04W 12/08 |
| 2020/0244636 A1* | 7/2020 | Varanasi | H04L 63/08 |
| 2020/0259636 A1* | 8/2020 | Gottipati | G06F 3/0641 |
| 2021/0136038 A1* | 5/2021 | Stokes | H04L 63/0442 |
| 2022/0038447 A1* | 2/2022 | Thangellapalli | H04L 67/146 |
| 2023/0108261 A1* | 4/2023 | Elkins | H04L 63/18 713/171 |
| 2023/0216947 A1* | 7/2023 | Bernardi | H04L 67/10 713/150 |
| 2023/0388304 A1* | 11/2023 | Ferenczi | G06F 9/451 |
| 2024/0146767 A1* | 5/2024 | Griffin | H04L 63/08 |
| 2024/0243905 A1* | 7/2024 | Kaplan | H04L 9/0825 |

OTHER PUBLICATIONS

Nikiforakis, Nick, et al. "Cookieless monster: Exploring the ecosystem of web-based device fingerprinting." 2013 IEEE Symposium on Security and Privacy. IEEE, 2013.*

Nikiforakis, Nick, et al. "On the workings and current practices of web-based device fingerprinting." IEEE Security & Privacy 12.3 (2014): 28-36.*

Nair, Krishna V., and Elizabeth RoseLalson. "The unique id's you can't delete: browser fingerprints." 2018 International Conference on Emerging Trends and Innovations in Engineering and Technological Research (ICETIETR). IEEE, 2018.*

Shihan Lin et al. "InviCloak: An End-to-End Approach to Privacy and Performance in Web Content Distribution" Proceedings of the 2022 ACM Sigsac Conference on Computer and Communications Security, ACMPUB27, New York, NY, USA, Nov. 7, 2022, pp. 1947-1961, XP058955598, DOI: 10.1145/3548606.3559336 ISBN: 978-1-4503-9466-6.

Nov. 15, 2024—(EP) Extended European Search Report—App No. 24188358.6.

Publickeycredential, mdn web docs, date of publication unknown but last modified May 9, 2023, 4 pages.

Google webpage, Creating public/private key pairs, date of publication unknown but last modified Jul. 18, 2023, 4 pages.

OpenSSL for Browser, Certificates Converter, date of publication unknown but last updated Dec. 25, 2019, 6 pages.

Making a unique extension id and key for Chrome extension?, date of publication unknown but original post made May 19, 2016, 3 pages.

* cited by examiner

SECONDARY DATA ENCRYPTION VIA BROWSER EXTENSION

FIELD OF USE

Aspects of the disclosure relate generally to computer communications security. More specifically, aspects of the disclosure may provide for improvements to transmissions by computing devices by providing a method via which, in addition to other forms of encryption, data may be selectively encrypted and transmitted/received using a web browser plugin.

BACKGROUND

During transfer of sensitive data, such as personal information, network security is paramount. For example, if a malicious party is able to monitor communications between two computers, that party might be able to determine sensitive information such as user passwords, user bank account information, and the like. Such theft might be imperceptible to both the sender and recipient of the sensitive data. For instance, an attack may be conducted in a manner whereby a malicious party may acquire sensitive information in a manner that is imperceptible to the sender/recipient of such information.

To improve such network security, many websites that commonly send and/or receive sensitive information (e.g., e-mail websites, banking websites) typically encrypt communications with users using Transport Layer Security (TLS) or similar cryptographic protocols; however, such approaches have flaws. For example, a malicious party might conduct a man-in-the-middle attack, such as one where the malicious party tricks a user's computing device into establishing an encrypted communication session with their computing device instead of an intended recipient computing device. In this way, the malicious party might trick users into believing they are safely communicating with a trusted third-party recipient when, in fact, their communications are being intercepted, decrypted, and/or inspected by a malicious party.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein relate to using a web browser plugin of a web browser application executing on a first party's computing device to establish, with one or more servers associated with a second party, a process whereby data can be selectively encrypted and transmitted between the two parties in addition to any other forms of encryption (e.g., TLS) that might already be in use. As will be detailed further below, a significant advantage of this process is that, even if other forms of encryption fail, a user's web browser application and the one or more servers may individually maintain secure information that permits them to exchange data. To effectuate this process, a computing device may execute a web browser application, and that web browser application may comprise a web browser plugin. That web browser plugin might send, to the one or more servers, information about the computing device such as a device fingerprint, an identification of the web browser application, and/or an identification of the web browser plugin. All such information may be used by the one or more servers to identify the computing device, to associate it with a particular user account, and/or to generate a server secret. The computing device may accordingly receive, in response, the server secret and a public certificate associated with a remote server. This information may then be used by both devices (that is, both the computing device and the one or more servers) to generate a session key using, e.g., the elliptic-curve Diffie-Hellman key agreement protocol. That session key may be used to selectively encrypt/decrypt information in a manner that is further encryption in addition to (e.g., on top of) any existing encryption protocols. For example, the computing device may later establish a TLS session with the one or more remote servers. The computing device may generate a session key based on, e.g., the server secret, the public certificate, the device fingerprint, the identification of the web browser plugin, a unique identifier of a user of the computing device, and/or a nonce string that periodically changes over time. Then, when the computing device receives data via the TLS session, even when the data is decrypted in accordance with the TLS protocol, one or more portions of the data may still be encrypted using the session key. The computing device may accordingly decrypt the one or more portions of the data that are still encrypted using the session key. This way, even if the TLS session is utterly compromised (e.g., by a man-in-the-middle attack), the data is still securely transmitted.

More particularly, a computing device may be configured to protect sensitive data even when TLS communication sessions are compromised. The computing device may send, via a web browser plugin of a web browser application executing on the computing device and to one or more remote servers, a request for a server secret that comprises a device fingerprint of the computing device, an identification of the web browser application, and an identification of the web browser plugin. The device fingerprint may identify, for example, hardware components of the computing device and/or a name of a network used by the computing device. The computing device may receive, from the one or more remote servers and in response to the request for the server secret, the server secret and a public certificate associated with the remote server. The computing device may establish, via the web browser application, a TLS session with the one or more remote servers. The computing device may generate a session key based on the server secret, the public certificate, the device fingerprint of the computing device, the identification of the web browser plugin, a unique identifier of a user of the computing device, and a nonce string. The nonce string may be determined, by the computing device, on a periodic basis. The computing device may receive, from the remote server and via the TLS session, data comprising unencrypted data and encrypted data. The encrypted data may comprise sensitive data. For example, the computing device may have sent, to the remote server, a request for sensitive data, and the encrypted data may comprise that sensitive data. The computing device may then decrypt the encrypted data based on the session key.

The computing device may additionally and/or alternatively use a public-private key pair to sign and/or store information provided to it by the one or more servers. Such signing and/or storing might be useful not merely so that the web browser plugin can generate the session key (as the session key might be, in some cases, generated based on signed information), but also because doing so may aid in the security of the stored data. For example, the computing device may generate, via the web browser plugin, a first public-private key pair, sign, using a first public-private key pair, the server secret and the public certificate, and store the signed server secret and the signed public certificate.

The computing device may be configured to store all or portions of the data transmitted by the one or more servers in temporary storage. As will be detailed below, such temporary storage might be useful because the session key itself is temporary due to, for example, the periodically-changing nature of a nonce string used to generate the session key. For example, the computing device may be configured to store the session key in temporary storage associated with the web browser plugin. That temporary storage may be configured to be deleted based on one or more of: closing of the web browser application, or expiration of a period of time.

The device fingerprint may be generated in a variety of ways. While in some cases it may be desirable to have the device fingerprint uniquely identify a particular computing device, in some cases the device fingerprint might simply be sufficiently unique to help identify a computing device associated with a particular user. For example, the computing device may generate the device fingerprint of the computing device by executing, in the web browser, code (e.g., code packaged in the browser extension).

Corresponding methods, apparatus, systems, and non-transitory computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
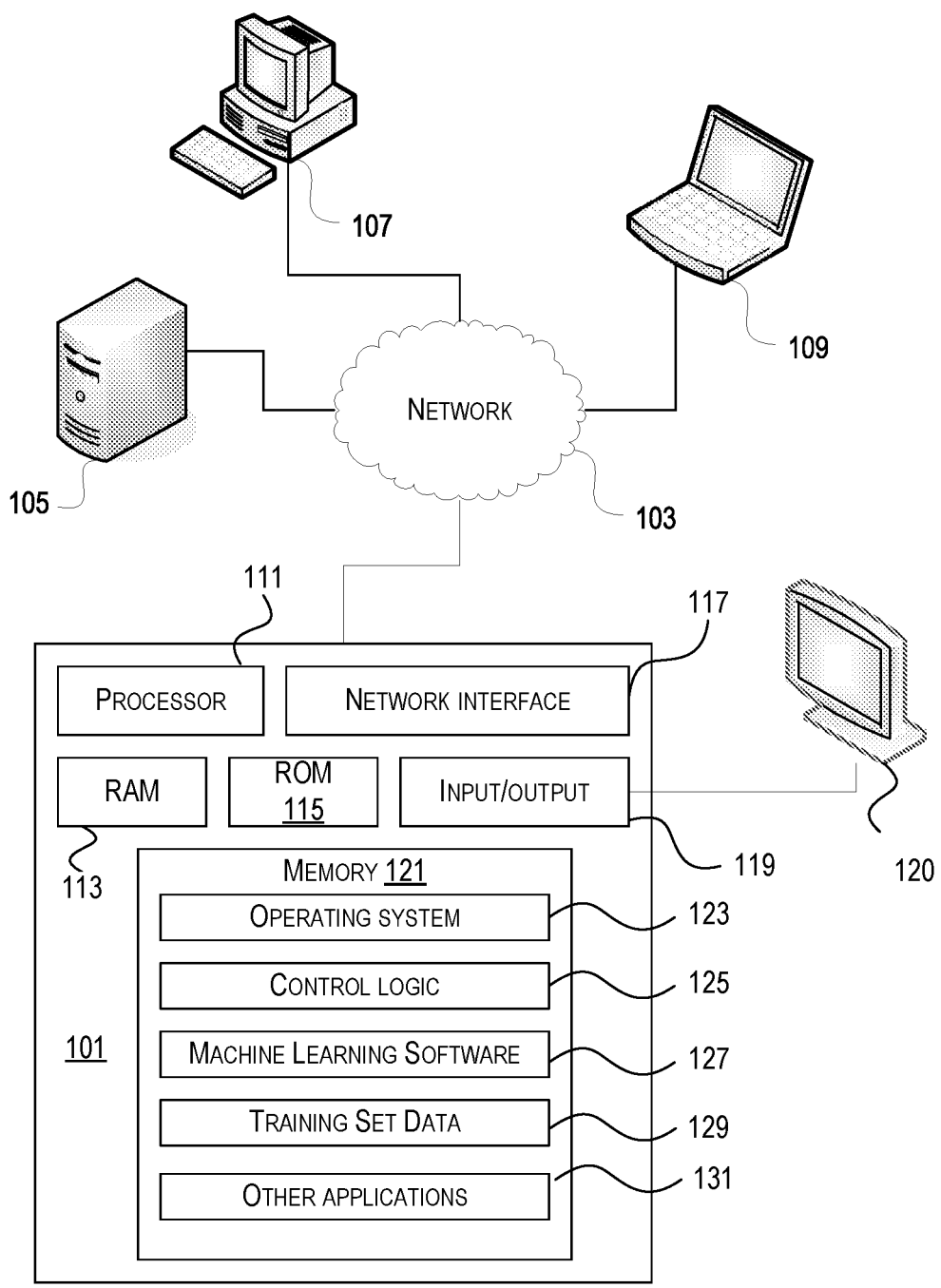
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, communications between computing devices may be encrypted for security purposes. That said, conventional encryption methods for communications (e.g., use of TLS) can be circumvented or otherwise exploited by malicious parties. For example, in some circumstances malicious users might conduct man-in-the-middle attacks on TLS communications and thereby gain unauthorized access to sensitive data. To avoid this risk, aspects described herein relate to a process whereby a web browser plugin and one or more servers work together to determine data (e.g., a periodically updated session key) that can be used to encrypt and/or decrypt data transmitted using other methods (e.g., TLS sessions). In this manner, even if other aspects of an encrypted session are compromised (e.g., even if the TLS session is compromised), sensitive data (e.g., password information, health information, bank account information) can be protected. This process further takes advantage of the unique aspects of web browser plugins, which can dynamically store/delete data on a periodic/instanced basis, improving security.

As an example of how the present disclosure may operate, a user device may access a bank account webpage managed by one or more servers. The user device may have installed a web browser plugin for a bank. That web browser plugin may send, to the one or more servers associated with the bank, a device fingerprint, an identification of a web browser application, and/or an identification of a web browser plugin. This information may be stored and used by the one or more servers to uniquely associate a user (e.g., of an account on the bank account website) with a specific device, web browser, and/or web browser plugin. The one or more servers may generate, based on that information, a server secret, then send the server secret and a public certificate to the user device. This allows both devices (the user device and the one or more servers) to periodically generate a session key based on data such as the server secret, the public certificate, the device fingerprint, the identification of the web browser plugin, a unique identifier (e.g., a username of) a user of the user device, and a periodically generated nonce string. Then, when either device transmits content via an encrypted session (e.g., a TLS session), the device may use the session key to decrypt/encrypt content. This means that, in some cases, content will be encrypted more than once: for example, once using the session key, and again using the TLS protocol. In this manner, even if the TLS encryption protocol were to not protect the data (due to, e.g., a man-in-the-middle attack), the data would still be encrypted and protected. Moreover, because the session key would be periodically generated (because, e.g., the nonce string is periodically generated), even if a malicious user were to learn the session key at a first time, the session key might not be usable at a second time.

Aspects described herein improve the functioning of computers by improving computer security. The present application fundamentally relates to the process by which two computing devices communicate, and in particular focuses on processes via which the two computing devices may ensure the security of certain aspects of data. This process could not be performed in the human mind due to the nature of the data involved, the complexity of cryptographic processing required, and because of the simple fact that all aspects involved relate to computer communications that involve, e.g., the transmission and receipt of bits. Moreover, this process is directly related to an existing issue with computing devices (e.g., the risk that encrypted communications may be compromised), and describes a process with which that issue can be remediated.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topologies and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, training set data 129, and other applications 131. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QOS), etc. For example, computing devices 101, 105, 107, 109, and others may operate in concert to provide parallel computing features in support of the operation of control logic 125 and/or machine learning software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
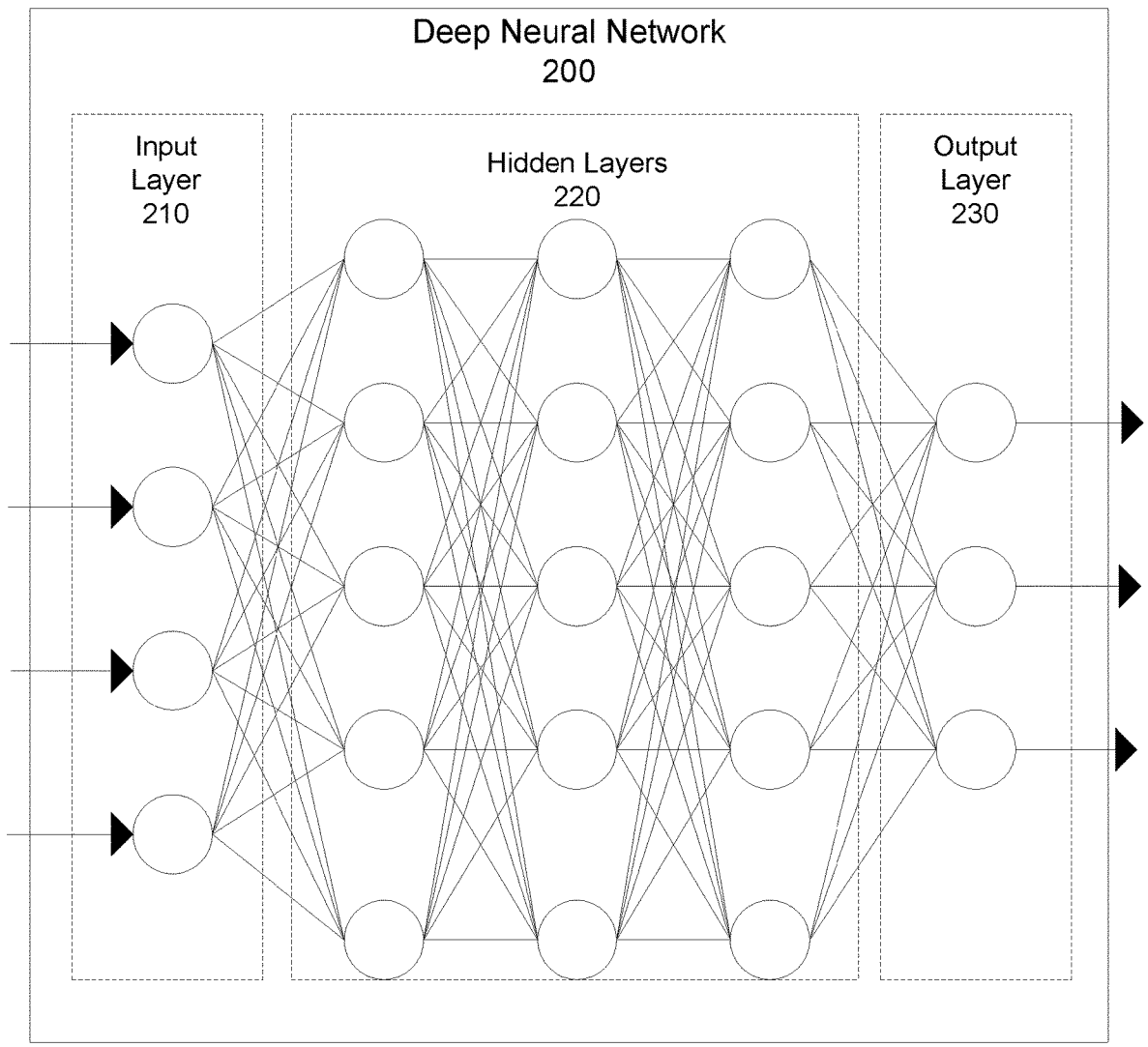
FIG. 2 depicts an example deep neural network architecture for a model according to one or more aspects of the disclosure.

FIG. 2 illustrates an example of a deep neural network architecture 200. Such a deep neural network architecture may be all or portions of the machine learning software 127 shown in FIG. 1. That said, the architecture depicted in FIG. 2 need not be performed on a single computing device, and may be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 210, one or more hidden layers 220, and an output layer 230. A deep neural network, as used herein, may be an artificial network that has more than one hidden layer. Illustrated network architecture 200 is depicted with three hidden layers, and thus may be considered a deep neural network. The number of hidden layers employed in deep neural network architecture 200 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Figure 3:
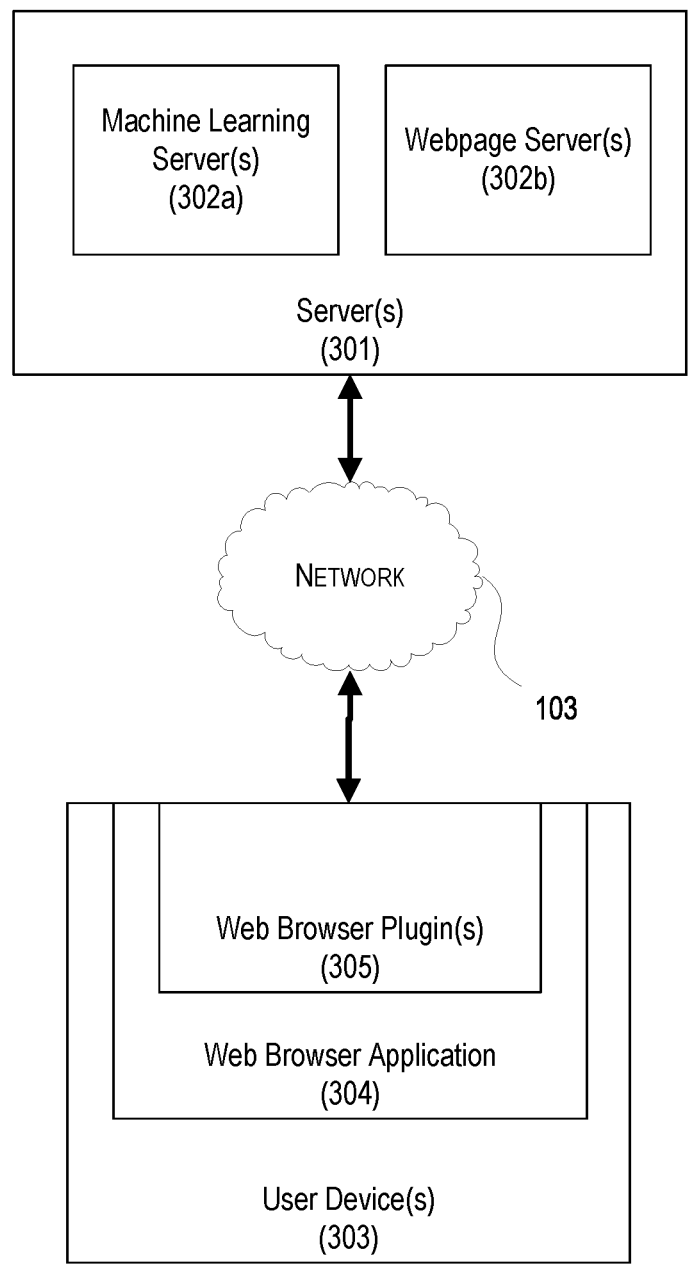
FIG. 3 depicts a system comprising servers (including machine learning servers and webpage servers) and user devices.

FIG. 3 depicts a system 300 comprising one or more servers 301 (that include one or more machine learning servers 302a and one or more webpage servers 302b) communicatively coupled, via the network 103, to one or more user devices 303. The one or more user devices 303 are shown as comprising (e.g., executing) a web browser application 304, which in turn may be associated with one or more web browser plugins 305. The one or more servers 301 and/or the one or more user devices 303 may comprise computing devices, such as computing devices that comprise one or more processors and memory storing instructions that, when executed on the one or more processors, cause the performance of one or more steps. The one or more servers 301 and/or the one or more user devices 303 may comprise any of the devices depicted with respect to FIG. 1, such as one or more of the computing devices 101, 105, 107, and/or 109.

The servers 301 may comprise one or more computing devices configured to, for example, provide access to one or more websites, store and/or generate cryptographic proofs, provide user login capabilities for a user, execute machine learning models (such as by executing the machine learning software 127), train those machine learning models, to provide input, receive output from those machine learning models, receive and/or transmit data via the network 103, and the like. For example, at least one of the one or more servers 301 may be configured to provide one or more webpages as part of a banking website that allows users to log in, access sensitive personal information such as banking information, and the like. As yet another example, at least one of the one or more servers 301 may be configured to generate a server secret, generate a session key, and transmit data encrypted based on the session key.

The one or more machine learning servers 302a may be configured to manage machine learning. For instance, the one or more machine learning servers 302a may be configured to train machine learning models, provide input to those trained machine learning models, and/or receive output from those trained machine learning models. This may involve storing data and/or managing (e.g., executing) applications associated with the deep neural network architecture 200. The one or more machine learning servers 302a may be configured to train a machine learning model by causing one or more nodes of an artificial neural network to be weighted based on training data. The one or more machine learning servers 302a may be configured to provide input to that trained machine learning model by, for example, providing input to an input node of the artificial neural network. The one or more machine learning servers 302a may be configured to receive output from that trained machine learning model by, for example, receiving data from an output node of the artificial neural network.

The one or more webpage servers 302b may be configured to provide one or more web pages, such as web pages that are part of a website that provides access to sensitive information. This process may include communications with the one or more user devices 303 via one or more unencrypted or encrypted communications sessions. For example, the one or more webpage servers 302b may be configured to, as part of providing one or more web pages to a user device of the one or more user devices 303, establish a TLS connection with the user device. As another example, the one or more webpage servers 302b may be configured to, as part of providing one or more web pages to a user device of the one or more user devices 303, establish a HyperText Transfer Protocol connection with the one or more user devices 303.

Though the one or more machine learning servers 302a and the one or more webpage servers 302b are shown as separate, these servers may execute on one or more of the same servers of the one or more servers 301. For example, the same server that trains a machine learning model may additionally manage one or more web pages. In this manner, the one or more servers 301 may be configured in a wide variety of ways to suit the needs of different organizations and/or users.

The one or more user devices 303 may comprise laptops, desktops, smartphones, or similar computing devices. The one or more user devices 303 may be configured to display user interfaces and receive user input via those user interfaces. For example, the one or more user devices 303 may be configured to allow a user to browse web pages provided by the one or more webpage servers 302b. As another example, the one or more user devices 303 may allow users to access the web browser application 304, install, uninstall, and/or otherwise manage the one or more web browser plugins 305, or the like.

The web browser application 304 may be any application that permits a user to access all or portions of a website. As such, the web browser application 304 may, but need not, be a commercial web browser application such as the CHROME web browser application provided by Google LLC of Mountain View, California, or the SAFARI web browser application provided by Apple Inc. of Cupertino, California.

The one or more web browser plugins 305 may comprise code (whether or not implemented in files) that modifies and/or augments the functionality of the web browser application 304. For example, the one or more web browser plugins 305 may be configured to provide translation services, to store passwords for a user, to provide additional interactive elements for discussion board websites, to block advertisements on web pages, or the like. The one or more web browser plugins 305 may be associated with an organization that manages the one or more servers 301, such that the one or more web browser plugins 305 may be configured to aid in communications between the one or more user devices 303 and the one or more servers 301. For example, as will be detailed further below, the one or more web browser plugins 305 may be configured to manage session keys, collect device fingerprint information, and decrypt/encrypt sensitive information transmitted from/to the one or more servers 301.

Figure 4:
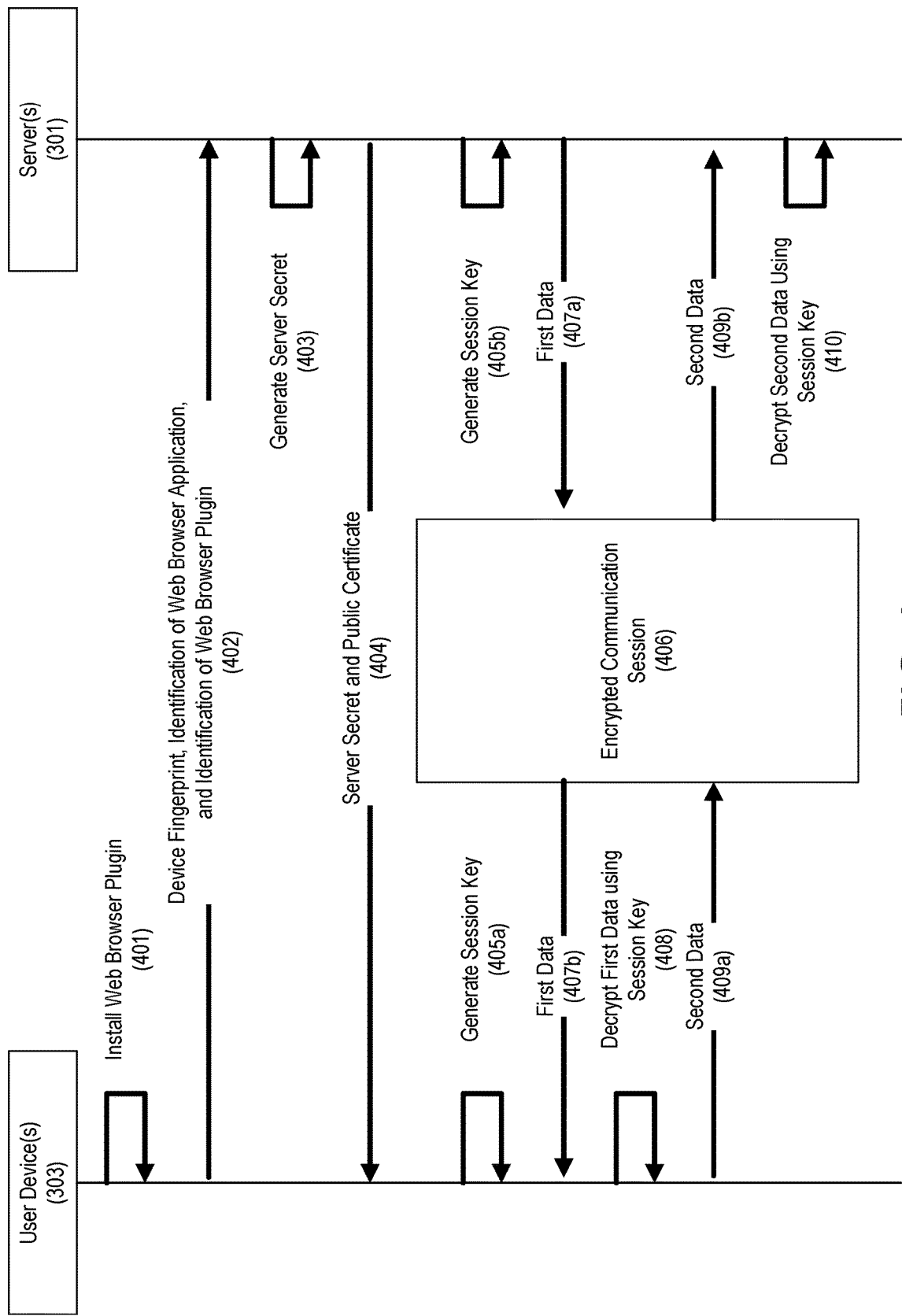
FIG. 4 depicts how a user device and one or more servers may transfer sensitive data by selectively encrypting data using a session key.

FIG. 4 depicts communications between the one or more user devices 303 and the one or more servers 301 as part of a process whereby the two sets of devices ultimately generate session keys and use those session keys for secure communications.

In step 401, the one or more user devices 303 may install a web browser plugin, such as the one or more web browser plugins 305. A user may, through a user interface of the web browser application 304, install such a plugin by selecting an option (e.g., in a plugin app store, on a web page provided by the one or more webpage servers 302*b*, or the like). While referred to as installation, the web browser plugin need not be processed in any particular way to augment the operations of the web browser application 304. For example, the web browser plugin may comprise one or more files that, when placed in an appropriate directory, are used by the web browser application 304 to augment its own features. During the installation process, a unique identifier for the web browser plugin may be determined. For example, a random string may be generated that is unique to that particular installation of the web browser plugin, such that the unique install of the web browser plugin can be distinguished from other installations (e.g., on other web browsers, on other user devices, or the like).

In many cases, the web browser plugin installed in step 401 may be associated with the same company and/or companies that manages the one or more servers 301. This has a number of advantages. On one hand, as will be detailed later, the one or more servers 301 may have access to unique identifying information for a user (e.g., their financial account) which might be tied to information collected by the web browser plugin (e.g., the device fingerprint) to help associate the one or more user devices 303 with a particular user. This can add security, as it can allow for the session key to be generated based on data specific to a user that need not be transmitted through a potentially compromised communication session. On the other hand, this allows for the unique configuration of the web browser plugin to meet security requirements. For example, the installed web browser plugin can be programmed to specifically communicate with the one or more servers 301 under certain conditions, preventing it from inadvertently transmitting sensitive data to unknown parties.

In step 402, the one or more user devices 303 may transmit, to the one or more servers 301, a device fingerprint, an identification of the web browser application 304 executing on the one or more user devices 303, and/or an identification of the web browser plugin installed in step 401.

The device fingerprint may be any indication of the one or more user devices 303, such as a serial number, information about hardware installed on the one or more user devices 303, information about one or more networks used by the user devices 303, or the like. The particular scope of the device fingerprint might vary based on security preferences of a user and based on the permissions available to the web browser application and the web browser plugin installed in step 401. For example, the device fingerprint may comprise a name of the one or more user devices 303, a serial number associated with the one or more user devices 303, or the like. As another example, the device fingerprint may comprise a list of hardware (e.g., input peripherals, display devices, video cards, processors, hard drives) of the one or more user devices 303. As yet another example, the device fingerprint may comprise current network information associated with the one or more user devices 303, such as a network that the one or more user devices 303 is connected to, an Internet Protocol (IP) address of the one or more user devices 303, a Media Access Control (MAC) address of the one or more user devices 303, or the like. While it may be desirable for the device fingerprint to be as unique as possible, practically this may not be the case. For example, if the device is based on hardware, then a user of a commercially-available smartphone will likely have a device fingerprint that is similar to other users of the same smartphone. That said, a sufficient combination of different factors (e.g., connected network, serial number, hardware) may sufficiently distinguish the device fingerprint of one user from all other users of the one or more servers 301.

The identification of the web browser application may be any identification of the web browser application 304, such as a name and/or version of the application (e.g., "Web Browser v3.01"), a specific application ID of the application (e.g., a hash that uniquely represents the version of the web browser), or the like. This identification need not be unique and, in many cases, it will be similar for many users. That said, in combination with the device fingerprint and the identification of the web browser plugin, such information may be used to distinguish the one or more user devices 303 from other devices that access the one or more servers 301. Moreover, the web browser application identification might be particularly useful because it may indicate which features can be performed by the web browser application 304 (e.g., whether the application can retrieve hardware information, how the application stores confidential data, etc.).

The identification of the web browser plugin may be usable to identify the particular web browser plugin. The identification might be unique to the world, such that each web browser plugin installed might report a unique value (e.g., a unique hashed string). Such a string might be determined during the installation of the web browser plugin. Additionally and/or alternatively, the identification need not be unique to the world, and might comprise a name of the web browser plugin, a version number of the web browser plugin, or the like.

As an alternative to sending a device fingerprint, the one or more user devices 303 may transmit a request for a shared secret value and/or a request for a certificate to the one or more servers 301. In this manner, the one or more user devices 303 need not transmit a device fingerprint, an identification of the web browser application 304 executing on the one or more user devices 303, and/or an identification of the web browser plugin installed in step 401 to the one or more servers 301 as part of step 402. For example, as part of step 402 and instead of sending a device fingerprint, the one or more user devices 303 may request a shared secret value and a certificate from the one or more servers 301.

In step 403, the one or more servers 301 may generate a server secret. The session secret may comprise a cryptographic string, a certificate, or the like. The server secret may comprise a data element that is generated based, in part, on the content transmitted from the one or more user devices 303 in step 402. In this manner, the server secret may be generated based on the device fingerprint, the identification of the web browser application 304 executing on the one or more user devices 303, and/or the identification of the web browser plugin installed in step 401. One reason why the server secret may be generated in this manner is that the server secret is thereby generated in a manner which is unique to the one or more user devices 303. For example, by generating the server secret based on a combination of data elements describing the one or more user devices 303, the session secret is unique to those one or more user devices 303 and is not, for example, necessarily tied to more sensitive information of a user (e.g., their username, their bank account). In step 404, the one or more servers 301 may send, to the one or more user devices 303, the server secret generated in step 403 as well as a public certificate. Such data might be sent as an HTTP response to the transmission in step 402. The public certificate may comprise information (e.g., a public key) which allows the user devices 303 to encrypt data for transmission to the servers 301. The public certificate may be different from any certificates used as part of a TLS session. The public certificate may comprise a key that was determined using Elliptic Curve Cryptography (ECC). In this manner, the one or more user devices 303 might be provided a session secret (which, as will be described below, can be used to encrypt data) and a public certificate for the one or more servers 301 (which can also be used to encrypt data). The combination will, as will be described below, allow both devices to encrypt data based on both the session secret and the public certificate using, e.g., the elliptic-curve Diffie-Hellman key agreement protocol.

As part of step 404, the one or more user devices 303 may store the server secret and the public certificate in long-term storage. For example, the one or more user devices 303 may store the server secret and the public certificate in a permanent data store associated with the web browser plugin. Prior to such storage, the server secret and/or the public certificate may be signed with, e.g., a public key, such as a public key indicated by the public certificate, and/or a public key associated with the one or more user devices 303.

After step 404, an encrypted communication session, such as a TLS session, may be established between the one or more user devices 303 and the one or more servers 301. The particular timing of this encrypted communication session is not important, and the procedures described herein may be implemented without such an encrypted communication session. That said, FIG. 4 displays such a session because it underscores the idea that encryption/decryption of data using the session key (as will be described below) is in addition to any encryption/decryption that occurs by virtue of such an encrypted communication session. In other words, data might be encrypted multiple times: using the session key, based on a TLS protocol, and based on any other encrypted communication protocols desired. In this way, even if all other encryption processes fail, the encryption/decryption process described here using the session key provides an added layer of security for particularly important (e.g., sensitive) information.

In step 405a and step 405b, both the one or more user devices 303 and the one or more servers 301 may generate a session key. The session key may be based on the server secret, the public certificate for the one or more servers 301, the device fingerprint of the one or more user devices 303, the identification of the web browser plugin, a unique identifier (e.g., a username of a user of the computing device, and a nonce string. The session key may be usable to, as desired, encrypt and decrypt communications transmitted between the one or more user devices 303 and the one or more servers 301. The session key may be then stored in a server-side data store.

The generation of the session key may be performed using the elliptic-curve Diffie-Hellman key agreement protocol (ECDH). The process described thus far with respect to FIG. 4 suggests that the one or more user devices 303 have a public certificate and server secret, but do not necessarily have the ability to decrypt communications because the public key would (in most instances) only permit the one or more user devices 303 to encrypt data for transmission to the one or more servers 301. The elliptic-curve Diffie-Hellman key agreement protocol provides one example of a way to remedy this issue: the protocol is usable to generate a session key (that is, in the terms of the protocol, a "shared secret," to be distinguished from the server secret generated in step 403) that can be used to encrypt communications in both directions. Other similar protocols may be used as well.

In addition to and/or as an alternative to both step 405a and step 405b, the one or more user devices 303 may send, to the one or more severs 301, a certificate, signed with one or more keys (e.g., a private key associated with the one or more user devices 303 and/or a public key associated with the one or more servers 301), that contains data. That data may comprise a signed version of the nonce string (e.g., signed using the private key associated with the one or more user devices 303), a public key associated with the one or more user devices 303, and/or an expiration period associated with the certificate. Additionally and/or alternatively, the certificate may comprise the server secret. In particular, the one or more user devices 303 may transmit the server secret back to the one or more servers 301 such that the server secret can be associated with a specific session key. At this stage, the server secret may be deleted, as it might be intended for one use only.

Step 405a and step 405b may be repeated on a periodic basis. Because the nonce string with which the session key is generated may be changed on a periodic basis, both the one or more user devices 303 and the one or more servers 301 may generate the session key on a periodic basis to account for changes in the nonce. The session key may therefore, like a one-time password or similar authentication concept, periodically update over time and be usable only for a period of time. In this way, even if a malicious user were to acquire the session key without permission, that session key might be valid for a short time period, and the risk of such theft is minimized.

Step 407a, step 407b, and step 408 provide one example of how the session key may be used, focusing in particular on transmission of sensitive data from the one or more servers 301 to the one or more user devices 303 and via the encrypted communication session 406. In step 407a and step 407b, first data may be transmitted via the encrypted communication session 406 to the one or more user devices 303. That first data may comprise a portion that has been encrypted based on the session key generated by the one or more servers 301 in step 405b. The two-step process via the encrypted communication session 406 reflects the idea that the first data may be further (e.g., additionally) encrypted as part of transmission by the one or more servers 301 and then further (e.g., additionally) decrypted upon receipt by the one or more user devices 303. Put more bluntly, even with this encryption/decryption as part of the encrypted communication session 406, the one or more servers 301 may have already encrypted some portion of the first data using the session key. This may mean that a portion of the first data might be encrypted twice: a portion of the first data might be first encrypted using the session key, then the totality of the first data (including the already-encrypted portion) might be further encrypted in accordance with the encrypted communication session 406. As such, even if the encrypted communication session 406 is compromised by malicious parties such that the encrypted communication session 406 is subject to a man-in-the-middle attack, the encrypted portion is not provided to the malicious parties. Then, as indicated by step 408, the one or more user devices 303 decrypts the encrypted portion of the first data after receipt.

Step 409a, step 409b, and step 410 provide another example of how the session key may be used, focusing in particular on transmission of sensitive data from the one or more user devices 303 to the one or more servers 301 and via the encrypted communication session 406. In step 409a and step 409b, second data may be transmitted via the encrypted communication session 406 to the one or more servers 301. That second data may comprise a portion that has been encrypted based on the session key generated by the one or more user devices 303 in step 405a. The two-step process via the encrypted communication session 406 reflects the idea that the second data may be further (e.g., additionally) encrypted as part of transmission by the one or more user devices 303 and then further (e.g., additionally) decrypted upon receipt by the one or more servers 301. Put more bluntly, even with this encryption/decryption as part of the encrypted communication session 406, the one or more user devices 303 may have already encrypted some portion of the second data using the session key. This may mean that a portion of the second data might be encrypted twice: a portion of the second data might be first encrypted using the session key, then the totality of the second data (including the already-encrypted portion) might be further encrypted in accordance with the encrypted communication session 406. As such, even if the encrypted communication session 406 is compromised by malicious parties such that the encrypted communication session 406 is subject to a man-in-the-middle attack, the encrypted portion is not provided to the malicious parties. Then, as indicated by step 410, the one or more servers 301 may decrypt the encrypted portion of the second data after receipt.

The process depicted in step 405a through step 410 may be repeated as desired. For example, both the one or more user devices 303 and the one or more servers 301 may periodically generate new session keys (e.g., to reflect new nonce strings), and those session keys may be used as desired to encrypt/decrypt data. That said, not all data needs to be encrypted. For example, each device might encrypt a portion of data using a session key based on a determination that the portion is particularly sensitive (e.g., is a payment card number, is a bank account number, includes password information, or the like). This includes data that might not be displayed to a user of either device. For example, the process described herein might be used to additionally encrypt password information transmitted from the one or more user devices 303 to the one or more servers 301 as part of a login process.

The process depicted in step 405a through step 410 may be configured such that the session key expires over a period of time. For example, the session key may expire every ten minutes, meaning that, after 10 minutes, steps such as step 402, step 403, step 404, step 405a, and step 405b may be repeated to generate a new session key. This may aid in security, as—even if the session key is acquired by an untrustworthy party—the time period during which the session key could be abused is limited.

The process depicted in step 405a through step 410 may involve use of a machine learning model, such as is described with respect to FIG. 2. As indicated by the previous examples, sensitive information may be encrypted and protected using the session key. In turn, to determine whether certain information should be encrypted, one or more of the computing devices described herein (e.g., the one or more user devices 303 and/or the one or more servers 301) may use a trained machine learning model. A trained machine learning model may be generated by training a machine learning model using training data that correlates various data formats with an indication of whether such data is sensitive (and thus warrants additional encryption). The computing device(s) may then provide, as input to the trained machine learning model, an indication of the format of certain data. The computing device(s) may then receive, as output from the trained machine learning model, an indication of a likelihood that the data is sensitive. For example, in response to being provided a sixteen-digit number data format (that is, the format of most payment cards), the trained machine learning model may be trained to input a high likelihood that the data is sensitive (and thus should be encrypted using the session key).

Figure 5:
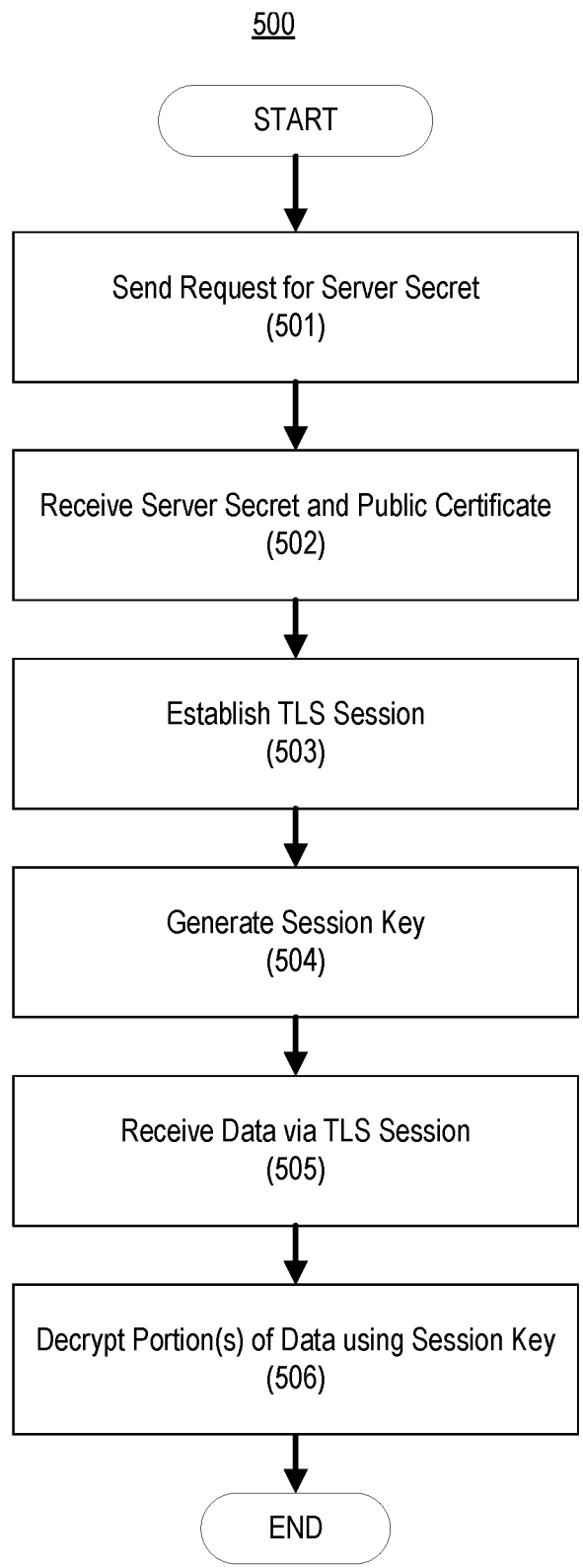
FIG. 5 depicts a flow chart comprising steps which may be performed to determine a session key and decrypt data received from a server.

FIG. 5 depicts a flow chart depicting a method 500 comprising steps which may be performed by a user device (e.g. the one or more user devices 303) as part of a process for protecting sensitive data. A computing device may comprise one or more processors and memory storing instructions that, when executed by the one or more processors, cause performance of one or more of the steps of FIG. 5. One or more non-transitory computer-readable media may store instructions that, when executed by one or more processors of a computing device, cause the computing device to perform one or more of the steps of FIG. 5. Additionally and/or alternatively, one or more of the devices depicted in FIG. 3, such as the one or more servers 301 and/or the one or more user devices 303, may be configured to perform one or more of the steps of FIG. 5. Moreover, all or portions of the steps of FIG. 5 may be the same or similar as the elements and concepts depicted with respect to FIG. 4. For simplicity, the steps below will be described as being performed by a single computing device; however, this is merely for simplicity, and any of the below-referenced steps may be performed by a wide variety of computing devices, including multiple computing devices.

In step 501, a user device may send a request for a server secret. This request may be part of installation of a web browser plugin and/or might be initiated by the web browser plugin without involvement of the user. In this way, the exchanges described herein between the one or more servers and the user device need not involve a user, and might instead transparently improve security in a manner that does not bother the user. The request may comprise information about the user device. For example, the user device may send, via a web browser plugin of a web browser application executing on the computing device and to one or more remote servers, a request for a server secret that comprises a device fingerprint of the computing device, an identification of the web browser application, and an identification of the web browser plugin.

As part of step 501, the user device may generate the device fingerprint. The device fingerprint may comprise any information about the user device. For example, the device fingerprint may identify hardware components of the computing device. Such hardware components might include names and/or operating parameters of input devices, display devices, storage devices, processor information, memory information, and the like. As another example, the device fingerprint may identify a name of a network used by the computing device. This process may involve executing code received from the one or more servers that causes collection of device fingerprint information. For example, the user device may generate the device fingerprint of the computing device by executing, in the web browser, code received from the one or more remote servers. In this way, the one or more remote servers might provide different code to different user devices and receive different device fingerprints, thereby improving the likelihood that device fingerprints are different for each user device.

In step 502, the user device may receive the server secret and the public certificate. For example, the user device may receive, from the one or more remote servers and in response to the request for the server secret, the server secret and a public certificate associated with the remote server.

The user device may be configured to securely store the server secret and the public certificate. For example, the user device may generate, via the web browser plugin, a first public-private key pair, sign, using a first public-private key pair, the server secret and the public certificate, and store the signed server secret and the signed public certificate. Such secure storage can be important, as the server secret and the public certificate may ultimately be used as part of session key generation, such that malicious acquisition of these data elements might potentially allow a malicious party to spoof session keys.

In step 503, a TLS session may be established between the user device and one or more servers. For example, the user device may establish, via the web browser application, a TLS session with the one or more remote servers. As described above with respect to FIG. 4, the TLS session need not be established at any particular time; however, for the purposes of illustration in FIG. 5, it is shown as occurring after the user device receives the server secret and the public certificate. This underscores the idea that the exchange of information between the user device and the one or more servers may occur long before the two devices exchange any sensitive information.

In step 504, the user device may generate a session key. Generating the session key may be based on a wide variety of data elements. For example, the user device may generate a session key based on the server secret, the public certificate, the device fingerprint of the computing device, the identification of the web browser plugin, a unique identifier of a user of the computing device, and/or a nonce string. As described above with respect to FIG. 4, the generation of a session key may be performed by both the user device and the one or more servers independently, and the session key may be generated, in part, using the elliptic-curve Diffie-Hellman key agreement protocol.

The session key may be stored by the user device in a manner that ensures that the session key is destroyed after a period of time. For example, the computing device may store the session key in temporary storage associated with the web browser plugin. In such a circumstance, the temporary storage may be configured to be deleted based on closing of the web browser application, expiration of a period of time, or the like. In this way, the session key is not undesirably stored for a long period, such that a malicious party could acquire the key and attempt to reverse-engineer it.

The user device may determine the nonce string on a periodic basis, which may ensure that the session key is valid for only a particular time period. For example, the user device may be configured to generate a unique nonce string every minute, every hour, or the like. The nonce may be then signed and stored in temporary storage associated with the web browser application. The user device may use the same algorithm to determine the nonce string as the one or more servers, such that the devices may separately generate the same nonce string using an algorithm and based on, e.g., the time of day. In this manner, even though the nonce string might change regularly, both the user device and the one or more servers might determine the same nonce string periodically and use that nonce string as the basis for periodically determining a new session key.

In step 505, the user device may receive data via the TLS session. For example, the user device may receive, from the remote server and via the TLS session, data comprising unencrypted data and encrypted data. This encrypted data may comprise sensitive information requested by a user. For example, the user device may send, to the remote server, a request for sensitive data, and that encrypted data may comprise the sensitive data. In other words, as discussed in the examples provided in FIG. 4, the data might be encrypted both using the session key and then again in accordance with the TLS protocol, such that the sensitive data is protected by both the TLS protocol and the encryption protocol associated with the session key.

In step 506, the user device may decrypt one or more portions of the data using a session key. For example, the user device may decrypt the encrypted data based on the session key. In this manner, the user device may access the data as desired without such data being acquirable by a malicious party, even if that malicious party has compromised an encrypted communication session (e.g., the TLS session described above).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device configured to protect sensitive data even when Transport Layer Security (TLS) communication sessions are compromised, the computing device comprising:
   one or more processors; and
   memory storing instructions that, when executed by the one or more processors, cause the computing device to:
      send, via a web browser plugin of a web browser application executing on the computing device and to one or more remote servers, a request for a server secret that comprises:
         a device fingerprint of the computing device, and
         an identification of the web browser plugin;
      receive, from the one or more remote servers and in response to the request for the server secret:
         the server secret, and
         a public certificate associated with the remote server;
      establish, via the web browser application, a TLS session with the one or more remote servers;
      generate a session key based on:
         the server secret,
         the public certificate,
         the device fingerprint of the computing device,
         the identification of the web browser plugin,
         a unique identifier of a user of the computing device, and
         a nonce string;
      receive, from the remote server and via the TLS session, data comprising unencrypted data and encrypted data; and
      decrypt the encrypted data based on the session key.

2. The computing device of claim 1, wherein the instructions, when executed by the one or more processors, cause the computing device to:
   determine the nonce string on a periodic basis.

3. The computing device of claim 1, wherein the instructions, when executed by the one or more processors, cause the computing device to:
   generate, via the web browser plugin, a first public-private key pair;
   sign, using a first public-private key pair, the server secret and the public certificate; and store the signed server secret and the signed public certificate.

4. The computing device of claim 1, wherein the instructions, when executed by the one or more processors, cause the computing device to:
store the session key in temporary storage associated with the web browser plugin, wherein the temporary storage is configured to be deleted based on one or more of:
closing of the web browser application; or
expiration of a period of time.

5. The computing device of claim 1, wherein the instructions, when executed by the one or more processors, cause the computing device to:
generate the device fingerprint of the computing device by executing, in the web browser, code received from the one or more remote servers.

6. The computing device of claim 1, wherein the instructions, when executed by the one or more processors, cause the computing device to:
send, to the remote server, a request for sensitive data, wherein the encrypted data comprises the sensitive data.

7. The computing device of claim 1, wherein the device fingerprint identifies one or more of:
hardware components of the computing device, or
a name of a network used by the computing device.

8. A method for protecting sensitive data even when Transport Layer Security (TLS) communication sessions are compromised, the method comprising:
sending, by a computing device, via a web browser plugin of a web browser application executing on the computing device, and to one or more remote servers, a request for a server secret that comprises:
a device fingerprint of the computing device, and
an identification of the web browser plugin;
receiving, by the computing device, from the one or more remote servers, and in response to the request for the server secret:
the server secret, and
a public certificate associated with the remote server;
establishing, via the web browser application, a TLS session with the one or more remote servers;
generating, by the computing device, a session key based on:
the server secret,
the public certificate,
the device fingerprint of the computing device,
the identification of the web browser plugin,
a unique identifier of a user of the computing device, and
a nonce string;
receiving, by the computing device, from the remote server, and via the TLS session, data comprising unencrypted data and encrypted data; and
decrypting, by the computing device, the encrypted data based on the session key.

9. The method of claim 8, further comprising:
determining the nonce string on a periodic basis.

10. The method of claim 8, further comprising:
generating, via the web browser plugin, a first public-private key pair;
signing, using a first public-private key pair, the server secret and the public certificate; and
storing the signed server secret and the signed public certificate.

11. The method of claim 8, further comprising:
storing the session key in temporary storage associated with the web browser plugin, wherein the temporary storage is configured to be deleted based on one or more of:
closing of the web browser application; or
expiration of a period of time.

12. The method of claim 8, further comprising:
generating the device fingerprint of the computing device by executing, in the web browser, code received from the one or more remote servers.

13. The method of claim 8, further comprising:
sending, to the remote server, a request for sensitive data, wherein the encrypted data comprises the sensitive data.

14. The method of claim 8, wherein the device fingerprint identifies one or more of:
hardware components of the computing device, or
a name of a network used by the computing device.

15. One or more non-transitory computer-readable media storing instructions configured to protect sensitive data even when Transport Layer Security (TLS) communication sessions are compromised, wherein the instructions, when executed by one or more processors of a computing device, cause the computing device to:
send, via a web browser plugin of a web browser application executing on the computing device and to one or more remote servers, a request for a server secret that comprises:
a device fingerprint of the computing device, and
an identification of the web browser plugin;
receive, from the one or more remote servers and in response to the request for the server secret:
the server secret, and
a public certificate associated with the remote server;
establish, via the web browser application, a TLS session with the one or more remote servers;
generate a session key based on:
the server secret,
the public certificate,
the device fingerprint of the computing device,
the identification of the web browser plugin,
a unique identifier of a user of the computing device, and
a nonce string;
receive, from the remote server and via the TLS session, data comprising unencrypted data and encrypted data; and
decrypt the encrypted data based on the session key.

16. The non-transitory computer-readable media of claim 15, wherein the instructions, when executed by the one or more processors, cause the computing device to:
determine the nonce string on a periodic basis.

17. The non-transitory computer-readable media of claim 15, wherein the instructions, when executed by the one or more processors, cause the computing device to:
generate, via the web browser plugin, a first public-private key pair;
sign, using a first public-private key pair, the server secret and the public certificate; and
store the signed server secret and the signed public certificate.

18. The non-transitory computer-readable media of claim 15, wherein the instructions, when executed by the one or more processors, cause the computing device to:
- store the session key in temporary storage associated with the web browser plugin, wherein the temporary storage is configured to be deleted based on one or more of:
  - closing of the web browser application; or
  - expiration of a period of time.

19. The non-transitory computer-readable media of claim 15, wherein the instructions, when executed by the one or more processors, cause the computing device to:
- generate the device fingerprint of the computing device by executing, in the web browser, code received from the one or more remote servers.

20. The non-transitory computer-readable media of claim 15, wherein the instructions, when executed by the one or more processors, cause the computing device to:
- send, to the remote server, a request for sensitive data, wherein the encrypted data comprises the sensitive data.

* * * * *